June 24, 1930.     C. S. LARKEY     1,768,260
ELECTRIC SWIVEL CONNECTION
Filed June 9, 1928
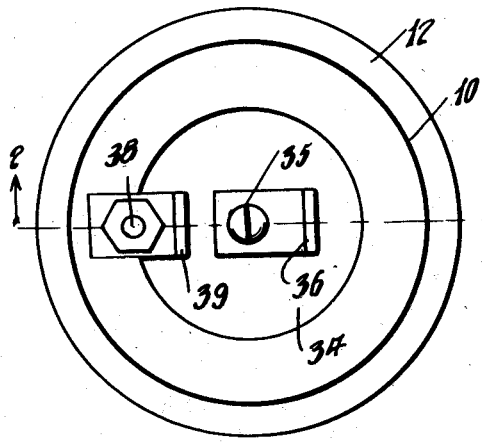
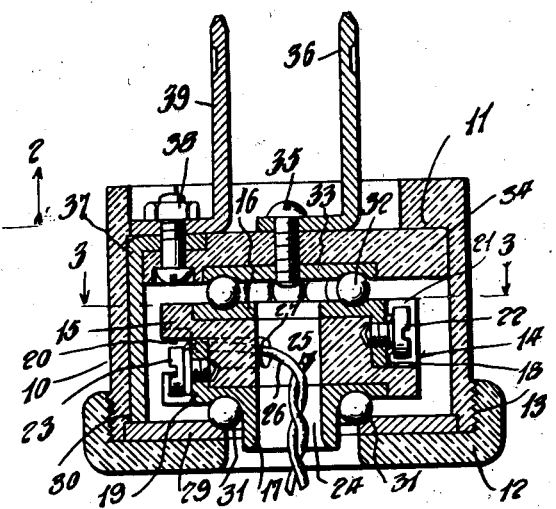
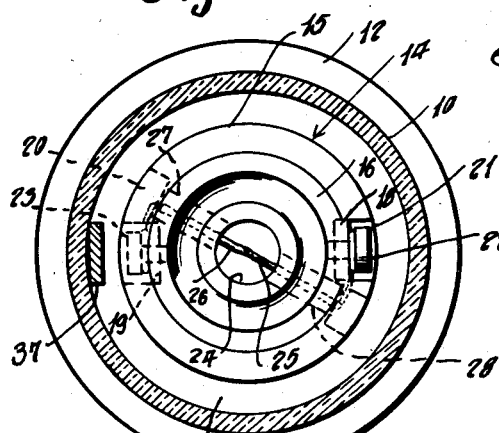
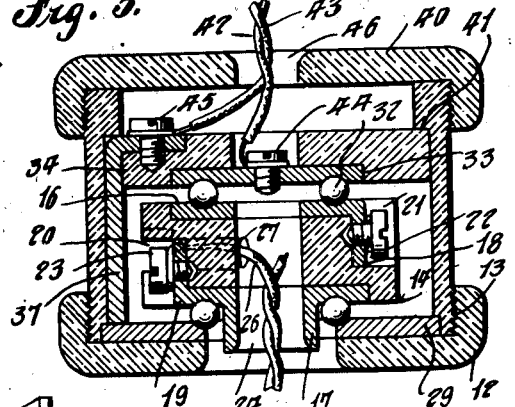
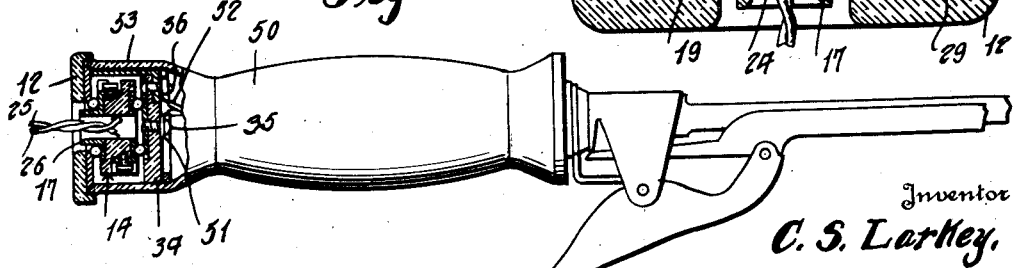
Inventor
C. S. Larkey,
By L. F. Rudolph Jr.
Attorney Patented June 24, 1930

1,768,260

UNITED STATES PATENT OFFICE

CHARLES S. LARKEY, OF TULSA, OKLAHOMA

ELECTRIC SWIVEL CONNECTION

Application filed June 9, 1928. Serial No. 284,226.

This invention relates to an electric swivel connection.

It is aimed to provide a novel construction whereby twisting and snarling of electric wires or conductors is avoided and wherein a two wire circuit is accommodated and the swivel mounted to operate on ball bearings.

A further object is to provide a novel structure wherein such ball bearings themselves constitute conductors to coact with mounting means also constituting conductors.

Additional objects and advantages will become apparent or be pointed out in the description following taken in connection with accompanying drawings illustrating an operative embodiment.

In said drawings:—

Figure 1 is a plan view of a ball bearing electric swivel constructed in accordance with my invention, Figure 2 is a sectional view taken on the line 2—2 of Figure 1, Figure 3 is a sectional view taken on the line 3—3 of Figure 2, Figure 4 is a side elevation of the swivel, Figure 5 is a vertical sectional view through a modified form and generally corresponding to Figure 2, and Figure 6 is a view partly in section and partly in elevation showing the invention as built into a curling iron.

In carrying out the invention, a suitable shell or casing structure is provided consisting of a sleeve 10 having a lug or shoulder 11 at one end and having a cap 12 screw threaded to the other end as at 13.

Located within the sleeve 10 is a swivel head 14. Such swivel head consists of a body 15 of insulation having metallic conductor elements 16 and 17 applied against opposite sides thereof and partly countersunk into the same. Said conductor disks 16 and 17 have angularly extending lugs 18 and 19, respectively, occupying recesses 20 and 21, in the body 15, whereby the disks cannot turn relatively to the body. The disks may be positively fastened to the body in any desired manner. Lugs 18 and 19 carry binding screws 22 and 23 respectively. The swivel has a central passageway or bore 24 extending therethrough so as to accommodate conductors or wires 25 and 26 which may pass respectively through openings 27 and 28 in the body and then be attached terminally by said binding screws 22 and 23. Cap 12 fastens a metallic conductor disk 29 removably against a shoulder 30 of the shell 10 and ball bearings 31 are interposed between the disks 17 and 29. Such ball bearings are metallic and electric conductors. Other ball bearings 32 are interposed between the disk 16 and a metallic conductor disk 33. Ball bearings 32 are also metallic and electric conductors. Disk 33 is carried by a plate 34 of insulation and is secured to that plate by a screw 35 which may also fasten a conductor prong 36 thereto. In contact with the disk 29 is a conductor strip 37 which is fastened by a bolt 38 to the plate 34 and which also fastens a conductor finger or prong 39 thereto.

By reason of the construction described, the conductors 36 and 39 may be plugged into a wall socket or the like to have current supplied to the wires 25 and 26 which are connected to any element utilizing the electric current. The connection is such however that the swivel head is at all times free to turn so that there is no danger of the wires twisting or snarling.

Various changes may be resorted to within the spirit and scope of the invention and for instance the form used as illustrated in Figure 5. This form unlike Figure 2 employs a cap 40 which is screw threaded at 41 to the sleeve or shell 10. In lieu of the fingers 36 and 39, cords or conductors 42 and 43 are used which are fastened by means of binding screws 44 and 45, respectively, to the contacts 33 and 37 in lieu of those at 35 and 38 of the preceding form. Such conductors 42 and 43 pass outwardly through a central opening 46 in the cap 40. This device shows that ball bearing swivel connections may be established between the ends of conductors and thus not necessarily at the location where the source of electric current is tapped.

Figure 6 shows another embodiment of the invention. A curling iron is generally shown which is representative of any device adapted to use electric current. This device has a handle 50 of suitable insulating material and shows a swivel structure similar to that illustrated in Figure 2. In lieu of the conductor prongs 36 and 39, however, conductor wires 51 and 52 extend from the binding posts 35 and 38, respectively, to the upper part of the iron or tool. In lieu of the shell 10, handle 50 is extended to provide a shell 53 integral therewith to contain the operating parts and the cap 12 is screw threaded directly onto such shell 53.

I claim as my invention:—

A connection of the class described, comprising a shell, a conductor disk carried thereby and provided with a central opening, a plate of insulation carried by the shell, a conductor secured to said plate and engaging the conductor disk, a conductor disk secured to said plate, conductors secured to said second conductor disk and the first mentioned conductor, said conductor disks providing bearing members, a swivel head within the shell consisting of a body of insulation, conductor disks on said swivel head oppositely disposed relatively to the first and second mentioned conductor disks, anti-friction bearing members of conducting material interposed between said oppositely disposed disks, and said swivel head having a central opening therein alined with the first mentioned opening and other openings connecting said central opening and the conductor disks secured thereto to receive conductor wires.

In testimony whereof I affix my signature.

CHARLES S. LARKEY.